United States Patent [19]

Colas

[11] 4,389,134
[45] Jun. 21, 1983

[54] COUPLING OF A TUBE TO A RING MEMBER

[75] Inventor: François Colas, Bourg la Reine, France

[73] Assignee: Cegedur Societe de Transformation de l'Aluminium Pechiney, Paris, France

[21] Appl. No.: 231,175

[22] Filed: Feb. 3, 1981

[30] Foreign Application Priority Data

Mar. 17, 1980 [FR] France ................................ 80 06185

[51] Int. Cl.³ .......................... B25G 3/00; F16B 9/00; F16L 41/00
[52] U.S. Cl. .................................. 403/263; 403/282; 403/284; 285/382.4
[58] Field of Search ............... 403/263, 282, 284, 361, 403/280; 285/382.4

[56] References Cited

U.S. PATENT DOCUMENTS 2,125,552  8/1938  Feldhoff ......................... 403/282 X
3,466,738  9/1969  Mount ........................... 285/382.4 X

*Primary Examiner*—Wayne L. Shedd
*Attorney, Agent, or Firm*—Dennison, Meserole, Pollack & Scheiner

[57] ABSTRACT

A coupling for two tubes forcibly engaged one into the other, the two tubes being substantially of the same sections while the female tube is engaged into a sleeve or an opening whose diameter is little larger than the outside diameter of said tube. Thus, the female tube is crimped or banded in the sleeve or opening while the male tube is forced to contract. This assembly means may be used for making balustrades or ladders or assembling various members which are fixed with respect to the tubes or the ring.

4 Claims, 6 Drawing Figures

COUPLING OF A TUBE TO A RING MEMBER

The present invention concerns a coupling of two tube elements by forcibly telescopingly engaging one into the other, the two tube elements in most cases being of the same sections and having relatively thin walls with respect to their diameter. The end of the tube which is taken as the male element and the end of the female tube, which are to be engaged one into the other, are respectively externally chamfered and internally conically bored with a beveled configuration, before the engagement operation.

This arrangement can advantageously be used for assembling transverse bars to a longitudinal member, for example for producing balustrades or ladders. It may also be used for assembling many other components which are respectively fixed with respect to male or female tube elements. Thus, it can be used for assembling panels which are intended for various uses, for example building construction.

Assembling tubes which are of substantially the same sections, by forcible engagement, is known from various patents. In order to have a particularly strong assembly, French Pat. No. 2,356,463 proposes that, at the moment of engagement, the tube which is taken as being the female element should be gripped in a nondeformable die to prevent any expansion of the female tube.

In the present invention, I do not provide an assembly operation in which the tube which is taken as the female tube is gripped in a nondeformable die at the moment of the forcible interengagement operation, as proposed in French Pat. No. 2,356,463. The object of the present invention is to provide an assembly operation in which expansion of the female tube is limited locally by self-crimping of the tube in a ring of small thickness and whose internal dimensions are equal to the external dimensions of the tube, plus a small clearance. This clearance permits the female tube easily to be introduced into the ring before the assembly operation. The tube may be introduced to a greater or smaller depth. The ring may be engaged onto the tube as far as the cylindrical portion, or it may be left at the location of the conical bore.

When the male tube is engaged into the female tube, the female tube is expanded at the position of the ring until it is crimped therein. In this way, it is possible to assemble a member which is fixed with respect to the male tube, both to a member which is fixed with respect to the female tube and a member which is fixed with respect to the ring. The ring may thus be fixed with respect to a flat sheet metal member or a shaped member. It is even possible to consider the edge of an opening formed in a sheet metal member or a shaped member, as a ring which is fixed with respect to the remainder of the sheet metal member or the shaped member.

The tubes and the ring may have a shape of revolution but they may equally well be of a cylindrical shape, of any section, such as elliptical or rectangular.

Before the assembly operation, a groove whose height is at least equal to the thickness of the ring may be machined around the female tube, at the location at which the ring is to be disposed after assembly. When the female tube expands at the moment of interengagement of the male tube, the ring is fixed in the groove.

If the radial clearance j between the female tube and the ring is relatively large while the groove is machined with a depth p such that $j+p>E$, wherein E is the thickness of the tube, the result is an assembly providing for rotary movement about the axis of the tubes. The ring rotates freely in the groove in the tube.

The invention may be used for example for assembling bars to a tubular shaped member which is provided with openings disposed at regular intervals corresponding to the spacing of the bars. In this way it is possible economically to produce balustrades or ladders.

The invention will be better appreciated from the following description of some particular embodiments which are illustrated in the accompanying drawings.

Figure 1:
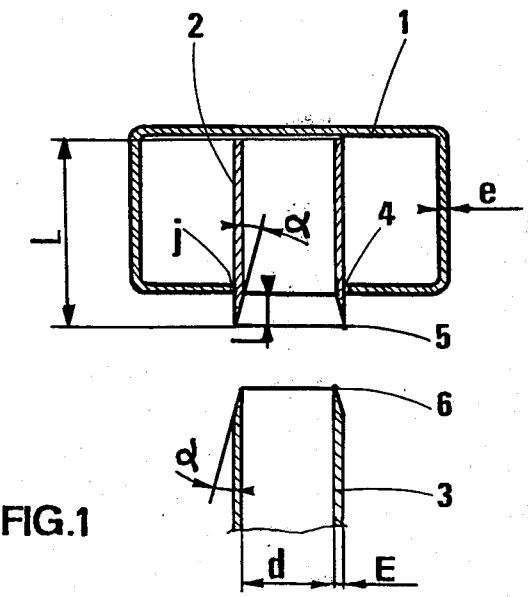
FIG. 1 is a cross section of a bar which is disposed facing an opening in a shaped member, a sleeve with a female opening already being in place in the opening in the shaped member.

FIG. 1 shows a tubular shaped member 1, a sleeve 2 and the end of a bar 3. The sleeve 2 whose length L is little greater than the thickness of the shaped member 1 has been cut from an aluminum tube with inside and outside diameters of 16 and 18 mm respectively, and which is identical to the tube from which the bar 3 is drawn. The sleeve 2 is introduced into the shaped member 1 by way of an opening 4 whose diameter is equal to the outside diameter of the sleeve 2 plus a slight additional clearance j; in this case, j=0.1 mm over the radius. One end 5 of the sleeve 2 is bored conically over a length 1, being at an angle α of the order of 7° to the axis. The corresponding end 6 of the bar has been chamfered in a beveled configuration, at the same angle α. The sleeve 2 and the tube 3 thus have at their ends walls which are cut in a beveled configuration, giving complementary male and female forms which are intended to facilitate subsequent interengagement thereof.

Figure 2:
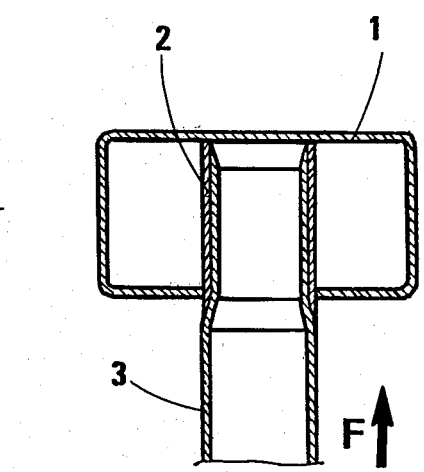
FIG. 2 shows the same components as those shown in FIG. 1, after the end of the bar has been forcibly engaged into the sleeve which is crimped in the opening in the shaped member.

In FIG. 2, the bar 3 has been forcibly engaged into the sleeve 2 by movement in the direction F. The sleeve 2 butts against the bottom of the sheet member 1 and is expanded in total by the clearance 2j between the sleeve 2 and the opening 4, having been prevented from further expansion by its being crimped in the edge of the opening 4. This locking action holds the sleeve 2 firmly assembled in the shaped member 1 while the bar 3 is assembled to the sleeve 2 by forcible engagement with contraction. This assembly is very strong, in a similar manner to that described in French Pat. No. 2,356,463.

Figure 3:
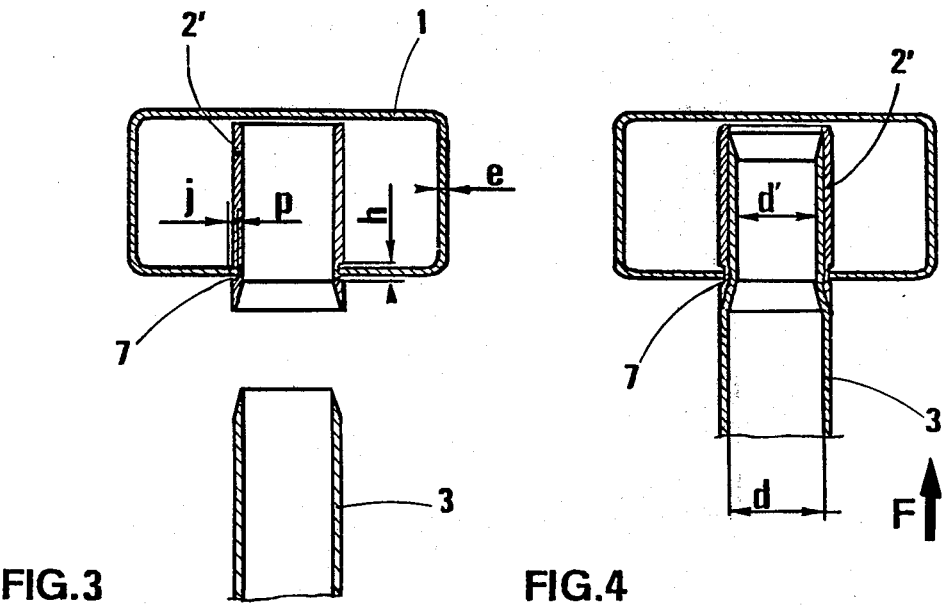
FIG. 3 shows the same bar and the same shaped member as in FIG. 1, a groove having been machined around the sleeve at the location of the opening of the shaped member.

FIG. 3 shows a sleeve 2' which is quite similar to the sleeve 2 of FIGS. 1 and 2, being engaged in a shaped member 1 which is identical to the previous shaped member. The sleeve 2' is of the same length L and the same inside and outside diameters of 16 and 18 mm, as the sleeve 2. The only difference between the sleeve 2' and the sleeve 2 is the peripheral groove 7 which is of height h=2.5 mm and depth p=0.2 mm, at the location of the sleeve corresponding to the opening 4 in the shaped member 1. The thickness e of the wall of the shaped member 1 is 2 mm.

Figure 4:
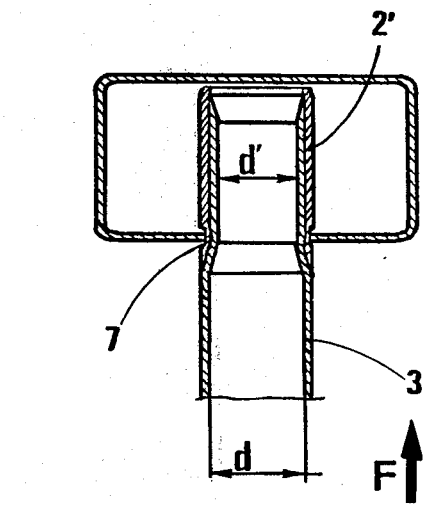
FIG. 4 shows the same components as in FIG. 3, after the end of the bar has been forcibly engaged into the sleeve.

In FIG. 4, the end of a bar 3 which is identical to that described hereinbefore has been forcibly engaged into the sleeve by movement in the direction F. In this embodiment, the sleeve 2' has been able to expand at the location of the opening 4 by $2j+2p$, that is to say, 0.6 mm, by virtue of the groove 7 therein. The inside diameter of the sleeve has thus changed from 16 mm to 16.6 mm, while the inside diameter d of the bar 3 is reduced in the engaged portion to a value d' of the order of 14.6 mm. The tube 3 is firmly gripped in the sleeve 2' over substantially the entire length 1 while the sleeve 2' is itself firmly engaged in the opening 4 by its groove 7.

It will be readily seen that, if $j+p>E$, but with $j<E$, the sleeve 2 is fixed with respect to the shaped member 1 by engagement in the groove 7 but rotates freely about its axis. This provides a rotatable assembly as between the shaped member 1, and the sleeve 2, and the tube 3.

It is possible to provide female tubes in which the conically bored portion 5 is at different levels with respect to the opening or ring 4.

Figure 5:
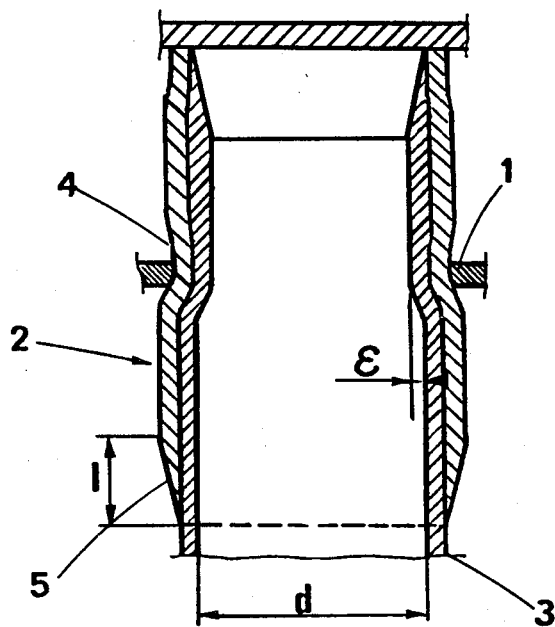
FIG. 5 shows the same elements as in FIG. 2 but on a larger scale, wherein the sleeve is long and projects beyond the opening in the shaped member.

As shown in FIGS. 1, 2 and 5, the female sleeve (or ring) 2 may project substantially beyond the opening 4, that is to say, by a length which is at least equal to the length 1 of its conically bored portion 5. In this case, the portion of the tube 2 in front of the opening 4 is not held and expands substantially by the thickness E of the male bar (or tube) 3. This can be particularly clearly seen from FIG. 5.

At the level of the opening 4, the sleeve 2 is crimped or banded and cannot expand; in contrast, the bar 3 must contract by a value $\epsilon = E-j$ over the radius. On the other side of the opening 4, the sleeve 2 is no longer supported and can expand freely under the thrust force of the bar 3, but the bar 3 has been constricted in passing through the opening 4. Expansion of the sleeve on the other side of the opening 4 is low; it corresponds to the spring-back effect of the tube, but also with a small amount of metal upsetting. For the sake of better understanding, the expansion effect has been shown in highly exaggerated form in FIGS. 5 and 6. It will be appreciated however that the fact that the sleeve 2 is expanded, even to a minimal extent, on respective sides of the opening 4, provides an excellent connection between the bar, the sleeve and the opening.

Figure 6:
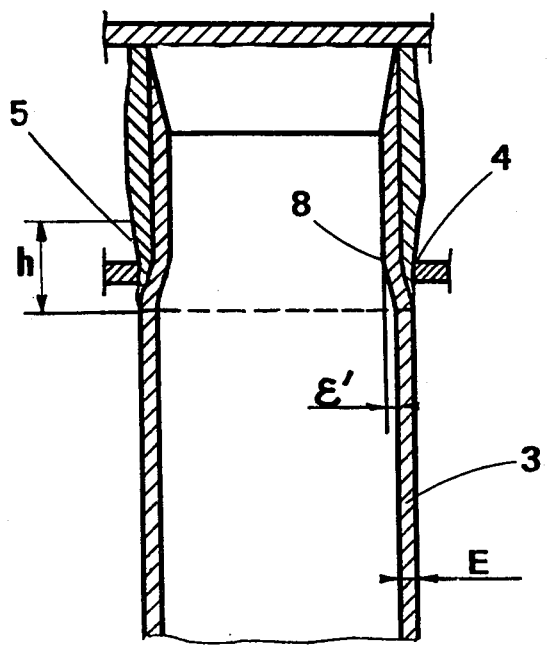
FIG. 6 shows an interengagement assembly in which the sleeve is short and the conically bored portion of the sleeve extends on respective sides of the opening in the shaped member.

In FIG. 6, the conically bored portion 5 of the ring projects beyond the opening 4 on respective sides. The male bar 3 is constricted at the level of the opening 4 but remains cylindrical on the other side thereof. It will be seen that the sleeve 2 is markedly expanded on respective sides of the opening 4; the sleeve is excellently held in place in the opening 4. The bar 3 is contracted only by $\epsilon'$ which is less than $\epsilon$.

It is possible for the same sleeve 2 to be provided with a plurality of successive grooves 7 and for a plurality of rings or walls 1 to be assembled by means of their parallel openings 4.

This assembly means may be used for many constructions other than balustrades and ladders. Thus, a series of male tubes 3 may be fixed with respect to a partitioning panel and shaped elements 1 or sleeve elements 2 which are embedded in another panel.

When it is stated that the two tubes 2 and 3 are "substantially" of the same sections, this means that it is possible without difficulty to envisage for example a bar 3 with diameters of 16 and 18 mm, with a sleeve 2 with diameters of 15 and 18 mm, or vice-versa.

I claim:

1. A coupling for a male tube member and a ring member comprising a pair of tube elements formed of aluminum or the like, said tubes having walls which are relatively thin with respect to tube diameter, one tube being the male element of the connection, the other tube being a female element, said male tube having a beveled end face, said female tube having a conically bored end face for cooperative engagement with said male end face, said female tube located within the ring member having a small thickness, the inside diameter of said ring member being just slightly larger than said female tube to permit a small clearance therebetween, said male tube when forcibly inserted into said female tube, expanding the same into tight engagement with said ring member.

2. A coupling as defined in claim 1 and further including a peripheral groove formed on the outer surface of said female tube for engagement by said ring member, the height of said groove corresponding to the thickness of the ring.

3. A coupling as defined in claim 2 wherein said female tube is free to rotate within said ring and wherein $j+p>E>j$ where p is the depth of the peripheral groove, j is ring clearance, and E is the thickness of the male tube.

4. A coupling as defined in claim 3 wherein a plurality of grooves and parallel rings are provided.

* * * * *